US006941562B2

(12) United States Patent
Gao et al.

(10) Patent No.: US 6,941,562 B2
(45) Date of Patent: Sep. 6, 2005

(54) METHOD OF <SCRIPT> BASED REMOTE JAVASCRIPT FUNCTION CALL OF WEB PAGE

(75) Inventors: Yang Gao, Fremont, CA (US); Zheng John Shi, San Francisco, CA (US); Shun Gao, San Jose, CA (US); Armeen Mazda, Tiburon, CA (US)

(73) Assignee: Appeon Corporation, Hong Kong (HK)

( * ) Notice: Subject to any disclaimer, the term of this patent is extended or adjusted under 35 U.S.C. 154(b) by 473 days.

(21) Appl. No.: 09/916,253

(22) Filed: Jul. 30, 2001

(65) Prior Publication Data

US 2002/0107890 A1 Aug. 8, 2002

Related U.S. Application Data

(60) Provisional application No. 60/251,056, filed on Dec. 1, 2000.

(51) Int. Cl.[7] ............................................. G06F 15/16

(52) U.S. Cl. ...................... 719/330; 715/513; 715/760; 709/203; 709/219; 719/311

(58) Field of Search ................................. 719/328–330, 719/310–320; 715/513, 760; 709/200–203, 217–219

(56) References Cited

U.S. PATENT DOCUMENTS

6,480,860 B1 * 11/2002 Monday ..................... 707/102
6,546,419 B1 * 4/2003 Humpleman et al. ........ 709/223

OTHER PUBLICATIONS

Goodman, Danny, "Danny Goodman's JavaScript Handbook" IDG Books Worldwide, 1996, pp. 32–35.*
Box et al., "Simple Object Access Protocol (SOAP) 1.1", W3C Note 08, May 2000, pp. 1–31, www.w3.org/TR/2000/NOTE–SOAP–20000508/.*

* cited by examiner

*Primary Examiner*—St. John Courtenay, III
(74) *Attorney, Agent, or Firm*—Patterson, Thuente, Skaar & Christensen, P.A.

(57) ABSTRACT

The present invention permits a JavaScript-based Remote Procedure Call (RPC) to be executed from a Web page displayed in a Web browser window, without utilizing browser plug-in, Java Applet, or ActiveX technology. Traditionally, clunky downloads and Web browser plug-ins has been required to enable Web page interactivity, which greatly compromises the performance and reach of the Web page. Based purely on HTML and JavaScript, the present invention utilizes the HTML <script> element to pass data to the server and execute a remote procedure, receiving the resulting output to the same displayed Web page. The present invention can be used to build a lightweight Web page that offers real-time data and interactivity.

8 Claims, 1 Drawing Sheet

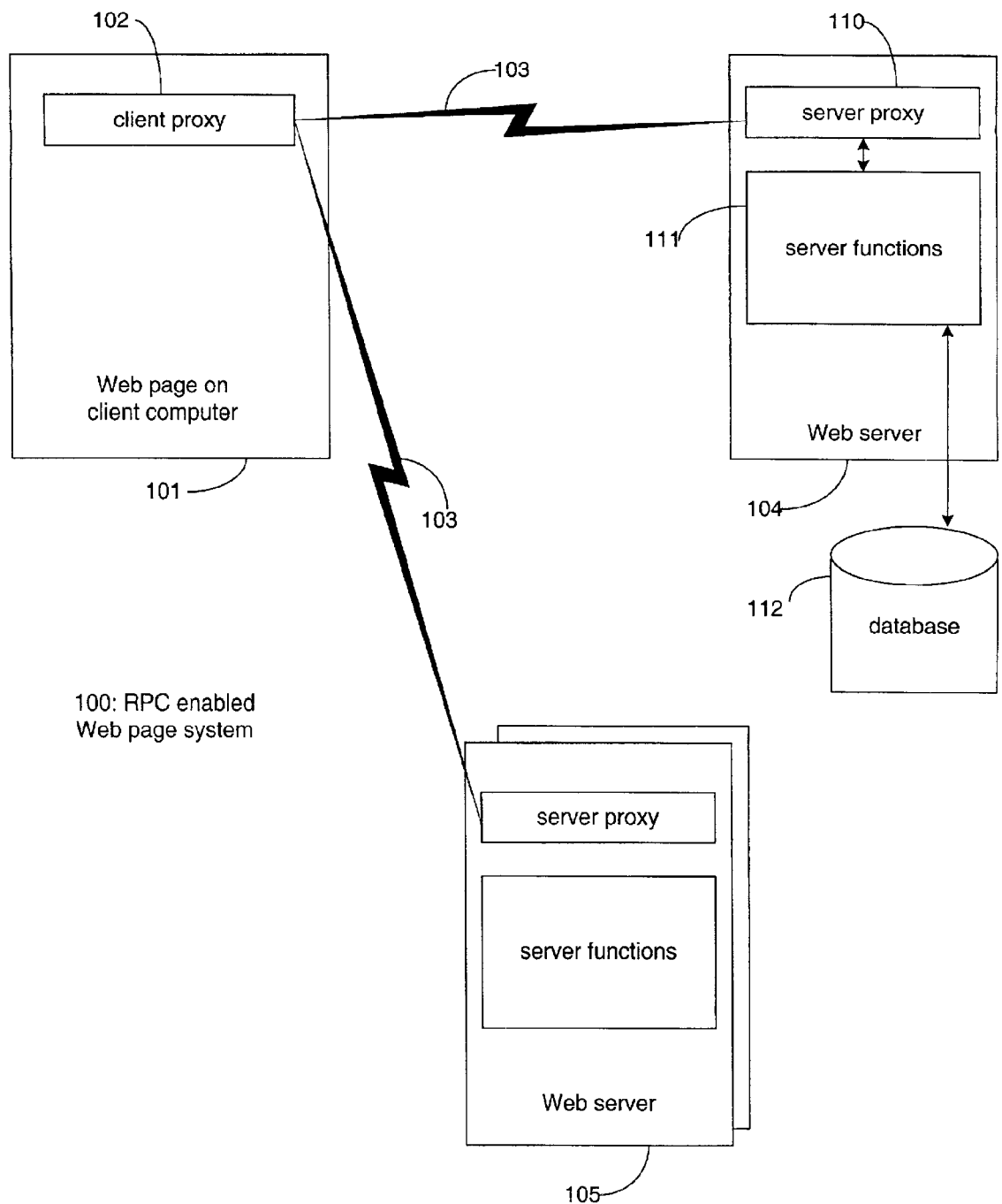

US 6,941,562 B2

METHOD OF <SCRIPT> BASED REMOTE JAVASCRIPT FUNCTION CALL OF WEB PAGE

CROSS-REFERENCE TO RELATED APPLICATIONS

This application claims the benefit of U.S. Provisional Application No. 60/251,056 filed Dec. 1, 2000.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The present invention relates generally to making JavaScript-based remote function calls from a Web page to one or more remote Web server(s).

2. Description of the Related Art

The Internet is a computer network that provides access to the World Wide Web ("the Web"), a vast collection of pages comprised of text, graphical, multimedia elements, and embedded programs ("client-side scripting"). Graphical user interface programs called Web browsers are employed by Internet users to receive, or download, the Web pages from servers and display the pages at their client computers. A Web browser displays Web pages by showing the text and graphical elements on a client display screen, by playing sound files and showing video sequences, and by running the embedded programs.

The rapid increase in the number of Internet users and in the amount of information being downloaded by users has resulted in high volumes of traffic that overload web servers, as well as increasing delays in downloading Web pages. Delays in downloading and displaying pages make an Internet user's browsing experience less enjoyable. This is especially true for Internet users who do not have high-speed access to the Internet. The response time for the transfer and displaying of page elements between servers and clients could be improved if the amount of data traffic passing over the Internet could be reduced, and more server computing tasks could be offloaded to the clients.

To download a Web page, a user at a client machine requests a Web page by sending a Web page address to the corresponding Web server. A Web page address is specified by a uniform resource locator (URL). When the Web server receives the URL request from a client machine, it determines the format and elements of the requested Web page and constructs a text file according to the hypertext mark-up language (HTML) standard. The HTML file specifies the text to be written and the Web page elements, such as URLs for image files that are to be viewed or displayed, and the format in which they should be presented. The server sends the HTML text file to the client machine, along with any corresponding data files specified by the HTML code.

At the client machine, the user's Internet browser receives the HTML code and automatically renders the page elements, displaying the text data, running the embedded programs, and sending further requests for files specified by URLs in the HTML code. The requests for files may include, for example, image files at servers other than the server from which the original HTML code was received. Thus, it should be apparent that displaying a single Web page may involve many different requests for data and numerous transfers of data between the client machine and one or more Web servers.

One contributor to the excessive Internet traffic that is slowing down the Web is the requirement for reloading of Web pages. Typically, each time a user "visits" a Web page by requesting its contents, that user's Web browser must reload the page data by requesting the entire HTML code and the corresponding data elements. Although some Web pages have a large number of elements that change frequently, it is more typical for a page to be largely static. That is, most of the page elements will not change. The download of Web pages could proceed much more smoothly if more elements of a Web page did not need to be transferred from a server each time the page makes a request.

Once a Web page is downloaded to a client computer's browser, there is no connection maintained with the Web server. In order to communicate with the Web server, the browser must refresh the entire page. This greatly limits how Web pages flow and its design, and results in much redundant data transmission.

The limitations of HTML are most pronounced when moving existing client-server applications to an HTML interface. Suddenly the entire user interface must be reengineered to conform to the page-by-page flow of HTML. Specifically, in bringing client-server applications onto the Web, a lot of unnecessary network traffic is added, and servers are burdened with most of the computing tasks. A better way would be to transfer only the necessary data and offload as many repetitive or resource-consuming computing tasks to the client's computer. Currently, however, Web servers must resend entire Web pages, which include the retransmission of many duplicated page components, and carry out mostly all computing tasks.

There is some effort in trying to fix this flawed Web-based client-server model. The Microsoft Corporation has a technology called "Remote Scripting", which uses a Java Applet at the Web page acting as a proxy of communication. Now the Web page can either receive more information from the Web server or send information back by calling a function: RSExecute( ) without refreshing the entire page. For detailed information on Microsoft's Remote Scripting, refer to Microsoft's website: http://msdn.microsoft.com/scripting/default.htm?/scripting/RemoteScripting/default.htm. Even after several years of promotion by Microsoft, Remote Scripting technology has not been widely adopted by Web developers. There are several reasons for this:

1. Slow: In order to use Remote Scripting, each Web page must include a Java Applet, acting as the client-side proxy, which must start Java Virtual Machine on the client's computer once the page is loaded. This is a slow process that introduces a 3–8 second delay in displaying the page for most personal computers.

2. Limited Server Compatibility: Remote Scripting only supports Microsoft Web server software, such as Internet Information Server, which must run on a Microsoft operating system, such as NT. Most high traffic and established commercial Websites use some variation of the Unix operating system and non-Microsoft Web server software, such as Apache. Therefore, most high traffic and established commercial websites cannot take advantage of Microsoft's Remote Scripting.

3. Single Server Access: Remote Scripting can only execute remote function calls back to the Web server that originally served the Web page. It cannot therefore make remote function calls to any other Web servers.

NetGratus, Inc. has already developed several generations of its own Remote Scripting technology that does not require a Java Applet to act as a proxy at the Web page. The previous generation of NetGratus Remote Scripting used a hidden <iframe> element as a proxy on the Web page to make remote JavaScript function calls for Microsoft browsers; it used a hidden <layer> element as a proxy on the Web page to make remote JavaScript function calls for Netscape browsers. The size of the JavaScript library on the client computer side was between 6 to 8 kilobytes. Since NetGratus Remote Scripting does not use a Java Applet as the client-side proxy, there is no loading delay associated with starting the Java Virtual Machine. The other advantage of NetGratus Remote Scripting over Microsoft's Remote Scripting is that it supports many different web server platforms and server operating systems.

The previous generation of NetGratus Remote Scripting still had significant limitations. It could not make remote function calls to other Web server except to the Web server from which that Web page originated from. The main reason this is that the <iframe> and <layer> elements are sub windows of the main Web page, and JavaScript has a security barrier between sub windows and the main window when these windows originate from different Web servers. As a result the main window cannot access data of the child window if the child window came from a different Web server and vice versa. Another side effect is that for every call made through the <iframe>, Internet Explorer adds a record to its history list. So after several remote function calls, several unwanted history records have been recorded, and Web users cannot easily use the "Back" or "Forward" buttons to go to the previous or next Web page.

From the discussion above, it should be apparent that there is a need for better means of making remote function calls from a Web page to remote Web servers. The method for remote function calls from a Web page should be easy to use, compatible with most server platforms, small in size (kilobytes), quick to load, and able to make function calls to multiple Web servers of different origins. The present invention fulfills this need.

BRIEF SUMMARY OF THE INVENTION

The invention permits a Web page to make JavaScript-based function calls (or RPC, Remote Procedure Call) from either Netscape or Microsoft Web browsers to remote Web servers of different origins. In accordance with the invention, the browser displays a Web page containing at least one JavaScript library acting as the client-side Web page proxy for the RPC. This client-side proxy essentially uses the <script> tag as the communication vehicle for sending or receiving data to and from Web servers. It is also necessary to have a Web server-side proxy for enabling the RPC. The server-side proxy can be implemented on any platform, such as Web server-side scripting (e.g. JavaScript, VBScript, ColdFusion, etc.), ISAPI-based C/C++, Java technologies, and so on.

Upon a trigger event, such as a mouse-over or a button click, the Web page will make a remote function call through the client-side proxy. The client-side proxy packages the remote function call into a URL, then sets the <script> tag's src property to that URL. At the Web server, the URL request is first handled by the Web server-side proxy, which in turn, uses the requested URL to regenerates the remote function call as if it were a local function call. The server-side proxy dispatches it to the function, receives the returned data from the function, packages that data in a format, which is understood by the Web client-side proxy, and returns that data package to the Web page. Upon receiving the data from the Web server-side proxy, the client-side proxy triggers a call back function to process the returned data. This entire process is completed without having to reload the page.

Other features and advantages of the present invention should be apparent and will be better understood by reference to the drawings and the following detailed description, which illustrate, by way of example, the principles of the invention.

BRIEF DESCRIPTION OF THE SEVERAL VIEWS OF THE DRAWING

FIG. 1 shows a system having a Web page on client computer and Web server constructed in accordance with the present invention.

DETAILED DESCRIPTION OF THE INVENTION

Typically, a Web page communicates back to the server when the user clicks the submit button on an HTML form. Once the submit button has been clicked, the browser takes the values from the form fields, builds an HTTP request, and then sends that to the server. The server receives the information, does what it needs to do—querying a database, for example—and then returns some data, usually in the form of a new HTML page. Although this method for data transmission is highly inefficient, because HTTP is a connectionless protocol that reduces the consumption of server resources, this method is still in use today.

Microsoft Java Applet based Remote Scripting, Netgratus <iframe> and <layer> based Remote Scripting and this invention, <script> based Remote Scripting, are all built on top of the HTTP; it uses HTTP requests to the server over the HTTP port (usually port 80), which simplifies firewall negotiation. Rather than relying on the user clicking on a submit button, all methods of Remote Scripting provide a mechanism to call code on the server (i.e. remote function calls), just as calls are made to client-side functions (i.e. local function calls). This mandates using both a client-side proxy, the client's communication agent, and a server-side proxy, the server's communication agent.

Microsoft's Java Applet-based Remote Scripting uses client-side JavaScript plus a client-side Java Applet as the client-side proxy. On the Web server-side, it uses server-side JavaScript as the proxy. The previous generation of NetGratus Remote Scripting, <iframe> and <layer> Remote Scripting, used only client-side JavaScript as the proxy. The client-side proxy uses <iframe> for Microsoft Internet Explorer browsers and <layer> for Netscape browsers as the vehicle to transport the data.

This invention, <script> Remote Scripting, also uses only client-side JavaScript as the proxy, but uses <script> instead of <iframe> and <layer> as the vehicle to transport the data. The server-side proxy can be implemented on any platform, such as Web server-side scripting (e.g. JavaScript, VBScript, ColdFusion, etc.), ISAPI-based C/C++, Java technologies, and so on.

FIG. 1 shows a system 100 having a Web page on client's computer 101 and one or more Web servers 104(1) and 104(2). Web page 101 includes a client-side proxy 102, which basically is a JavaScript library. Client-side proxy 102 can communicate with multiple Web servers 104(1) and 104(2). On each of those Web servers there is a server-side proxy 110, which handles the URL requests from client-side proxy 102 and dispatches the function calls to different server functions 111. Server functions 111 can access data sources, such as database 112, or access other server functions 111, and return the results to server-side proxy 110. The server-side proxy 110 then packages the results into a format understandable by the client-side proxy 102, and also triggers a call back function at the client-side proxy 102. The client-side proxy 102 then retrieves the data from the server-side proxy 110 and uses it for client-side processes. The next section shows a sample code for implementing the client-side proxy 102.

```
var __NG__CallingPool="";
var __NG__Busy=false;
function getUniqueString()
{
    var d = new Date();
    var unique = d.getTime() + " " + Math.floor(1000*Math.random());
    return unique;
}
function NGExecute(rspage,callback,func,parms)
{
    //1. tranlate function to URL
    var strFunc=rspage+"?R="+getUniqueString()
    strFunc+="&F="+escape(func)
    if(callback!=null)
        strFunc+="&C="+callback
    if (parms != null)
    {
        if (typeof(parms) == "string")
        {
            strFunc+="&P0="+parms;
        }
        else
        {
            for( var i=0;i<parms.length; i++ )
                strFunc+="&P"+i+"="+escape(parms[i]);
        }
    }
    //2. insert into calling pool
    __NG__CallingPool+=strFunc+"$"
    URLCall()
}
function URLCall()
{
    if(__NG__CallingPool.length>1 && !__NG__Busy)
    {
        __NG__Busy=true;
        var index=__NG__CallingPool.indexOf('$');
        var src=__NG__CallingPool.substring(0,index)
        document.scripts('ng__script').src=src;
    }
    else
    {
        setTimeout(URLCall,100);
    }
}
function NGTrigger(callback,param,errCode)
{
    var index=__NG__CallingPool.indexOf('$');
    __NG__CallingPool=__NG__CallingPool.substring(index+1,
    __NG__CallingPool.length)
    __NG__Busy=false;
    var strF=callback+"("+errCode+",'"+param+"')";
    eval(strF);
}
```

The next section shows the sample code for a sample Web page 101:

```
<html>
<script language="JScript" id="ng__script" src="Library.js"></script>
<script language=JavaScript>
function test(){
    NGExecute("script.asp", "FCallBack", "getdata3", Array('d1', 'd2'))
}
```

-continued

```
function FCallBack(errCode, strData){
    if(errCode==0){
        document.body.innerHTML+=strData+"<br>";
        status="FCallBack: " + strData;
    }
    else {
        alert(strData)
    }
}
</script>
<body>
<a href="" onmouseout="test()">This is the test page</a>
</body></html>
```

As shown in the above sample codes for both Web page 101 and the client-side proxy 102, the client-side proxy 102 uses <script> as a communication vehicle to send or receive data from the Web server. The original purpose of <script> tag is used to define browser script code or the source of browser script code. This invention uses the <script> tag in a new and innovative way. Every time a Web page makes a remote function call (RPC), the client-side proxy 102 generates a URL for the function that includes the Web page name, the calling function name, the call back function name, and values to be passed to the remote function (parameters), which are sent to Web servers 104 through the <script> tag's SRC attribute. Upon data arrival from the Web servers 104, the call back function is triggered and the Web page 101 can access the returned data of the RPC. Notice that the URL generated by the client-side proxy 102 may have the same domain as the Web page 101, or can even use a different domain to another Web server 104(2). This means that once Web page 101 is downloaded to the client's computer, it can make RPC calls to one or more Web servers of different origins without reloading the original Web page 101.

The above sample code works for Microsoft's Internet Explorer browsers. The implementation of client-side proxy 102 for Netscape browsers is slightly different but uses the same core mechanism. The next section shows an implementation of client-side proxy 102 for Netscape browsers.

```
var __NG__CallingPool="";
var __NG__Busy=false;
var __NG__Container;
var vis=true;
function load()
{
    if (document.layers)
    {
        __NG__Container = new Layer(100);
        __NG__Container.visibility = (vis)? 'show' : 'hidden';
        __NG__Container.clip.width = 100;
        __NG__Container.clip.height = 100;
    }
}
function getUniqueString()
{
    var d = new Date();
    var unique = d.getTime() + " " + Math.floor(1000*Math.random());
    return unique;
}
function NGExecute(rspage,callback,func,parms)
{
    //1. tranlate function to URL
    var strFunc=rspage+"?R="+getUniqueString()
    strFunc+="&F="+escape(func)
    if(callback!=null)
        strFunc+="&C="+callback
```

```
        if (parms != null){
            if (typeof(parms) == "string") {
                strFunc+="&P0="+parms;
            }
            else {
                for( var i=0;i<parms.length; i++ )
                    strFunc+="&P"+i+"="+escape(parms[i]);
            }
        }
        //2. insert into calling pool
        _NG_CallingPool+=strFunc+"$"
        URLCall()
}
function URLCall()
{
        if(_NG_CallingPool.length>1 && !_NG_Busy) {
            _NG_Busy=true;
            var index=_NG_CallingPool.indexOf('$');
            var src=_NG_CallingPool.substring(0,index)
            strHTML="<html><script src='"+src+"'>"+"</"+"script></html>"
            if(_NG_Container)
                _NG_Container.document.write(strHTML)
            else {
                load();
                _NG_Container.document.write(strHTML)
            }
        }
        else {
            setTimeout(URLCall,100);
        }
}
function NGTrigger(callback,param,errCode)
{
        var index=_NG_CallingPool.indexOf('$');
        _NG_CallingPool=_NG_CallingPool.substring(index+1,
            _NG_CallingPool.length)
        _NG_Busy=false;
        var strF=callback+"("+errCode+",'"+param+"')";
        eval(strF);
}
```

The server-side proxy 110 can be implemented by any Web server-side technologies, such as, JSP, EJB, ISAPI, and so on. The next section shows an implementation of server-side JavaScript running on Microsoft's IIS Web server. It can easily port to any other Web server-side technologies.

```
<script runat=server language=JavaScript>
function ngDispatch(validFuncs){
    var func = ngBuildFunc( validFuncs );
    if (func !="") {
        var retval = eval(func);
        if (retval != null)
            ngReturn(retval);
    }
}
function ngReturn(data) {
            Response.Write("NGTrigger('"+Request('C')+"',
                '"+ngEscape(data)+"',0);");
            Response.End();
}
function ngEscape( str ){
    return str.replace( /\'/g, "\\'");
}
function ngBuildFunc(validFuncs){
            var func, i, aValid;
            func = ""
            if(Request("F")!="")
                func = Request("F");
```

```
            if(validFuncs.indexOf(func)<0)
                ngReturnError(func + " is not a valid function")
            func += "(";
            if(Request("P0").Count!=0){
                var i=0;
                var index="P"+i;
                for(;Request(index).Count!=0; index="P"+i){
                    func += "'"+Request(index)+"',";
                    i++;
                }
                func=func.substr(0,func.length-2);
                func += "'";
            }
            func += ")";
            return func;
}
function ngReturnError(str){
            Response.Write("NGTrigger('"+Request('C')+"',
                '"+ngEscape(str)+"',1);");
            Response.End();
}
</script>
```

The next section shows the sample code for server functions 111. This is an implementation for Microsoft IIS and ASP. It can easily port to other Web server-side technologies. The first line is used to include the source code of server proxy 110.

```
<!--#include file="serverproxy.inc"-->
<%
ngDispatch( "getdata1, getdata2, getdata3")
%>
<script runat=server language=JavaScript>
    function getdata1(){
        return "This is the data for getdata1";
    }
    function getdata2(str1) {
        return "This is the data for getdata2, input:"+str1;
    }
    function getdata3(str1,str2)    {
        return "This is the data for getdata3, input1:"+str1+", input2:"+str2;
    }
</script>
```

The above sample codes show how to make sequential RPCs to one or more remote Web servers. By using additional <script> tags, the client-side proxy 102 can make multiple simultaneous RPCs to one or more remote Web servers. Each <script> tags serve as one communication channel for the Web page to Web server.

The above sample code also shows how to make a RPC to one or more Web servers. This invention enables Web pages to directly access server-side functions. With little modification, it also enables Web pages to directly access services provided by objects running at the server-side. For example, a Web page now has direct access to a DCOM, CORBA, or EJB objects' methods. The sample code below shows how to directly access a DCOM object's methods from a Web page.

Client Side Web page sample code:
```
    <html><head><title>Test Script</title></head>
    <script language="JScript" id="ng_script" src="LibraryIE.js"></script>
    <script language=JavaScript>
    function test()
    {
        NGExecute("http://localhost/LiveML/agent.asp",                "FCallBack",
        "VBComponent.DummyObject", "GetData2", Array('Hello', 'World'))
    }
    function FCallBack(errCode, strData)
    {
        if(errCode==0){
            document.body.innerHTML+=strData+"<br>";
            status="FCallBack: " + strData;
        }else {
            alert(strData)
        }
    }
    </script>
    <body>
    <a href="" onmouseout="test()">This is the main page</a>
    </body></html>
```
Client Side proxy code:
```
    // <SCRIPT>
    var _NG_CallingPool="";
    var _NG_Busy=false;
    function getUniqueString()
    {
        var d = new Date();
        var unique = d.getTime() + " " + Math.floor(1000*Math.random());
        return unique;
    }
function NGExecute(rspage,callback,object,func,parms)
{
    //1. tranlate function to URL
    var strFunc = rspage + "?R=" + getUniqueString();
    strFunc += "&O=" + object + "&F=" + escape(func);
    if (callback != null)
        strFunc += "&C=" + callback;
    if (parms != null)
    {
        if (typeof(parms) == "string")
        {
            strFunc+="&P0="+parms;
        }
        else
        {
            for (var i = 0; i < parms.length; i++)
                strFunc += "&P" + i + "=" + escape(parms[i]);
        }
    }
    //2. insert into calling pool
    _NG_CallingPool += strFunc + "$";
    URLCall();
}
function URLCall()
{
    if (_NG_CallingPool.length > 1 && !_NG_Busy)
    {
        _NG_Busy = true;
        var index =_NG_CallingPool.indexOf('$');
        var src =_NG_CallingPool.substring(0,index);
        document.scripts('ng_script').src = src;
    }
    else
    {
        setTimeout(URLCall, 100);
    }
}
function NGTrigger(callback, param, errCode)
{
    var index = _NG_CallingPool.indexOf('$');
    _NG_CallingPool = _NG_CallingPool.substring(index+1,_NG_CallingPool.length);
    _NG_Busy = false;
    var strF = callback + "(" + errCode + ",'" + param +"')";
    eval(strF);
}
```

-continued

```
Server Side proxy code:
<%ngDispatch()%>
<script runat=server language=JavaScript>
function ngDispatch(){
    // retrieve object, method and parameters
    var obj, func;
    if (Request("O").Count != "")
        obj= Request("O");
    else{
        ngReturnError("missing object name");
        return;
    }
    if (Request("F").Count !="")
        func = Request("F");
    else{
        ngReturnError("missing method name");
        return;
    }
    var param = "(";
    if (Request("P0").Count != 0)      {
        var i, index = "P0";
        for (i=1; Request(index).Count != 0; i++){
            param += "'" +Request(index) + "',";
            index = "P"+i;
        }
        param = param.substr(0, param.length-1);
    }
    param += ")";
    // create the object
    var object = Server.CreateObject(obj);
    if (object == null){
        ngReturnError("Failed to create object" + obj);
        return;
    }
    // call requested method
    var method = "object." + func + param;
    var retval = eval(method);
    if (retval != null)
        ngReturn(retval);
}
function ngReturn(data){
  Response.Write("NGTrigger('"+Request('C')+"','"+ ngEscape(data)+"',0) ;");
  Response.End();
}
function ngReturnError(str){
  Response.Write("NGError('"+Request('C')+"','"+ ngEscape(str)+"',1);");
  Response.End();
}
function ngEscape(str){
 return str.replace( /\\/g, "\\V");
}
function ngBuildFunc(validFuncs){
    var func, i, aValid;
    func = ""
    if(Request("F")!="")
        func = Request("F");
    if(validFuncs.indexOf(func)<0)
        ngReturnError(func + " is not a valid function")
    func += "(";
    if(Request("P0").Count!=0){
        var i=0;
        var index="P"+i;
        for(;Request(index).Count!=0; index="P"+i){
            func += "'"+Request(index)+"',";
            i++;
        }
        func=func.substr(0,func.length-2);
        func += "'"
    }
    func += ")";
    return func;
}
</script>
```

The present invention has been described above in terms of presently preferred embodiments so that an understanding of the present invention can be conveyed. There are, however, many configurations for network data delivery not specifically described herein, but with which the present invention is applicable. The present invention should therefore not be seen as limited to the particular embodiments described herein, but rather, it should be understood that the present invention has wide applicability with respect to network data delivery generally. All modifications, variations, or equivalent arrangements and implementations that are within the scope of the attached claims should therefore be considered within the scope of the invention.

We claim:

1. A method for executing an RPC (Remote Procedure Call) over HTTP from a Web page within an application window at a client device, the method comprising:
   containing, in the application window of the client device, at least one Web page;
   transmitting, to a server, an HTTP request initiated by a first HTML element embedded in a main window of the at least one Web page, said first HTML element including a URL;
   invoking, at a server, a procedure or a set of program code identified by the URL of said first HTML element;
   receiving, at a Web browser from said server in the transmitting action, output of said procedure or program code in the invoking action into a second HTML <script> element.

2. A method as defined in claim 1, wherein said application window is a Web browser window.

3. A method as defined in claim 2, said first HTML element in the transmitting action and said second HTML element in the receiving action are contained within the same Web page.

4. A method as defined in claim 2, said first HTML element in the transmitting action and said second HTML element in the receiving action are contained within different Web pages, at least one of which is hosted by a different server.

5. A method as defined in claim 1, wherein said first HTML element in the transmitting action is an HTML <script> element.

6. A method as defined in claim 5, wherein said first HTML element in the transmitting action is the same as the second HTML <script> element in the receiving action.

7. A method as defined in claim 1, wherein said first HTML element in the transmitting action is an HTML <img> element.

8. A method as defined in claim 1, wherein said first HTML element in the transmitting action is an HTML <embed> element.

* * * * *

UNITED STATES PATENT AND TRADEMARK OFFICE
CERTIFICATE OF CORRECTION

PATENT NO. : 6,941,562 B2
DATED : September 6, 2005
INVENTOR(S) : Yang Gao et al.

It is certified that error appears in the above-identified patent and that said Letters Patent is hereby corrected as shown below:

<u>Title page,</u>
Item [73], Assignee, delete "Appeon Corporation, Hong Kong (HK)" and insert
-- Appeon Corporation (A BVI Corporation, formerly called Appnova, Inc.) --.

Signed and Sealed this

Fifteenth Day of November, 2005

JON W. DUDAS
*Director of the United States Patent and Trademark Office*